US012585669B2

(12) United States Patent
Muralidhar et al.

(10) Patent No.: US 12,585,669 B2
(45) Date of Patent: *Mar. 24, 2026

(54) STAGE REPLICATION IN A CLOUD DATA LAKE

(71) Applicant: Snowflake Inc., Bozeman, MT (US)

(72) Inventors: Subramanian Muralidhar, Mercer Island, WA (US); Polita Paulus, Kirkland, WA (US); Sahaj Saini, Seattle, WA (US); Saurin Shah, Kirkland, WA (US); Srinidhi Karthik Bisthavalli Srinivasa, Bellevue, WA (US)

(73) Assignee: Snowflake Inc., Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/819,108

(22) Filed: Aug. 29, 2024

(65) Prior Publication Data

US 2024/0419685 A1     Dec. 19, 2024

Related U.S. Application Data

(63) Continuation of application No. 18/119,775, filed on Mar. 9, 2023, now Pat. No. 12,093,281, which is a continuation of application No. 17/396,576, filed on Aug. 6, 2021, now Pat. No. 11,620,307.

(60) Provisional application No. 63/197,951, filed on Jun. 7, 2021.

(51) Int. Cl.
G06F 16/20      (2019.01)
G06F 16/25      (2019.01)
G06F 16/27      (2019.01)
G06F 16/955     (2019.01)

(52) U.S. Cl.
CPC ............ *G06F 16/27* (2019.01); *G06F 16/254* (2019.01); *G06F 16/9566* (2019.01)

(58) Field of Classification Search
None
See application file for complete search history.

(56) References Cited

U.S. PATENT DOCUMENTS

| | | | |
|---|---|---|---|
| 8,689,115 | B2 | 4/2014 | Vonog et al. |
| 9,256,659 | B1 | 2/2016 | Willett et al. |
| 10,044,566 | B1 | 8/2018 | Grisco et al. |
| 10,491,692 | B1 | 11/2019 | Feiguine et al. |
| 10,992,598 | B2 | 4/2021 | Grunwald et al. |

(Continued)

*Primary Examiner* — Jau Shya Meng
(74) *Attorney, Agent, or Firm* — Womble Bond Dickinson (US) LLP

(57) ABSTRACT

Described herein are techniques for replicating external stages between deployments of e.g., a cloud data lake using a modified storage integration. The modified storage integration may be defined with a set of storage locations. The storage integration comprises a base URL for each of the set of storage locations and each storage location identifies a remote deployment where a cloud platform is hosted and a geographic region of the remote deployment. An external stage object may be bound to the storage integration, where the external stage object facilitates a data loading operation that is currently in progress on the first storage location. In response to detecting an outage at the first storage location, the data loading operation that was in progress on the first storage location may be continued at the second storage location using the storage integration.

20 Claims, 9 Drawing Sheets

(56) References Cited

U.S. PATENT DOCUMENTS

| | | | |
|---|---|---|---|
| 2006/0212669 | A1 | 9/2006 | Uchida et al. |
| 2006/0248082 | A1 | 11/2006 | Raikar et al. |
| 2009/0063575 | A1 | 3/2009 | Blea et al. |
| 2012/0233251 | A1 | 9/2012 | Holt et al. |
| 2014/0006660 | A1 | 1/2014 | Frei et al. |
| 2016/0350391 | A1 | 12/2016 | Vijayan et al. |
| 2017/0192863 | A1 | 7/2017 | Eluri et al. |
| 2019/0042609 | A1* | 2/2019 | Senthilnathan ..... G06F 16/2423 |
| 2021/0014047 | A1 | 1/2021 | Guim Bernat et al. |
| 2021/0058399 | A1 | 2/2021 | Kapoor et al. |
| 2021/0103852 | A1* | 4/2021 | Kamenetskaya ....... G06F 9/505 |

* cited by examiner

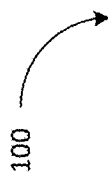
100
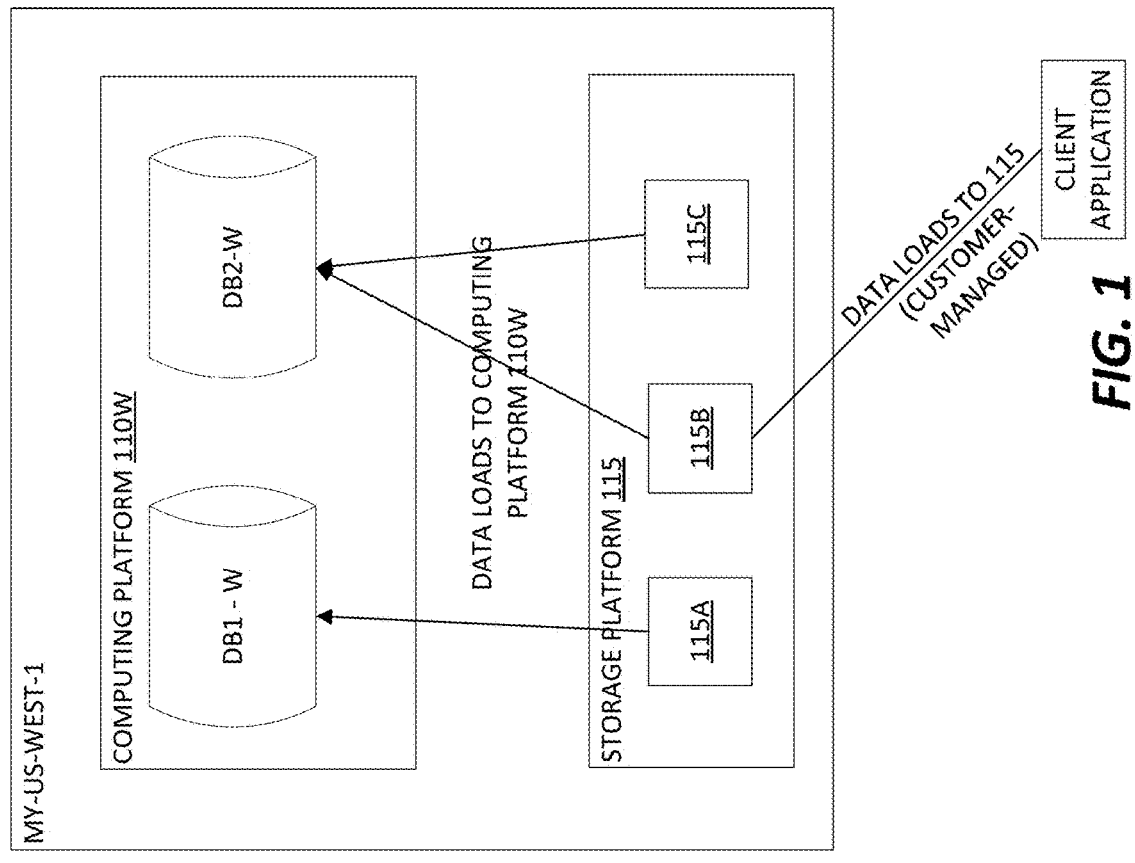
MY-US-WEST-1
COMPUTING PLATFORM 110W
DB2-W
DB1 - W
DATA LOADS TO COMPUTING PLATFORM 110W
STORAGE PLATFORM 115
115C
115B
115A
DATA LOADS TO 115 (CUSTOMER-MANAGED)
CLIENT APPLICATION
FIG. 1

```
CREATE STORAGE INTEGRATION my_integration
TYPE = EXTERNAL_STAGE
STORAGE_LOCATIONS =

(
    NAME = 'my-us-east-1'
    STORAGE_PROVIDER = 'S3'
    STORAGE_BASE_URL = 's3://my_bucket_us_east-1/'
    ENCRYPTION = (TYPE = 'AWS_SSE_KMS' KMS_KEY_ID = 'my_key')
  ), {
    NAME = 'my-us-west-2'
    STORAGE_PROVIDER = 'S3'
    STORAGE_BASE_URL = 's3://my_bucket_us_west-2/'
    STORAGE_AWS_ROLE_ARN = 'role-arn-us-west'
    ENCRYPTION = (TYPE = 'AWS_SSE_KMS' KMS_KEY_ID = 'my_key')
  )

STORAGE_ALLOWED_LOCATIONS = ('/my_folder/my_sub_folder')
STORAGE_BLOCKED_LOCATIONS = ('/my_folder/my_sub_folder/secret')
ACTIVE = 'my-us-east-1';
ENABLED = true;
```

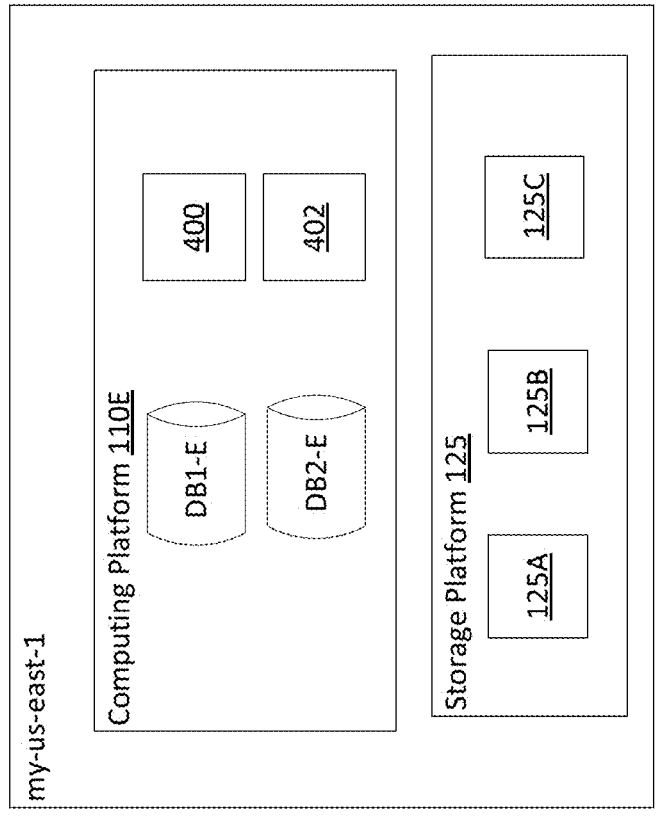
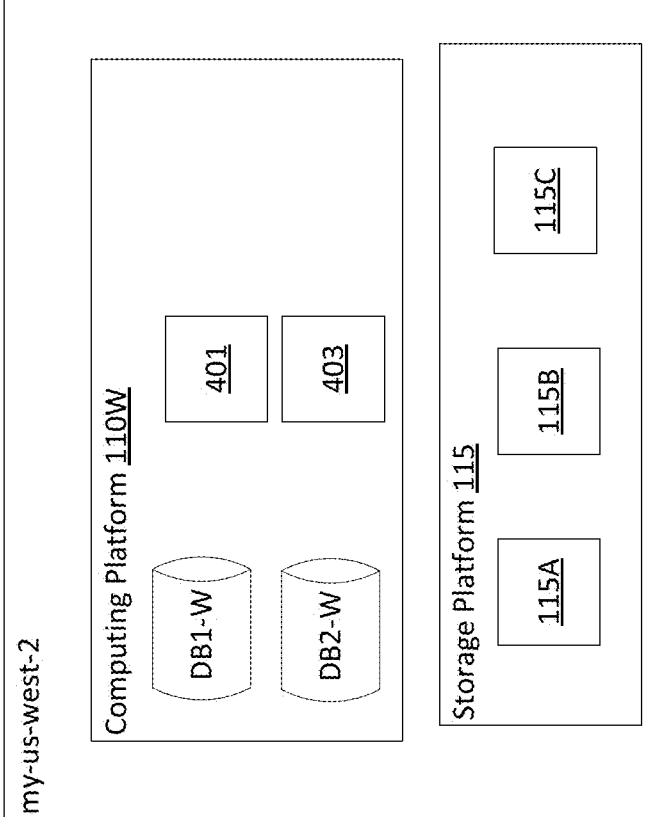
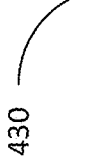
*FIG. 4B*

```
CREATE STAGE my_external_stage
RELATIVE_URL = '/my_folder/my_sub_folder/'
STORAGE_INTEGRATION = my_integration;
```

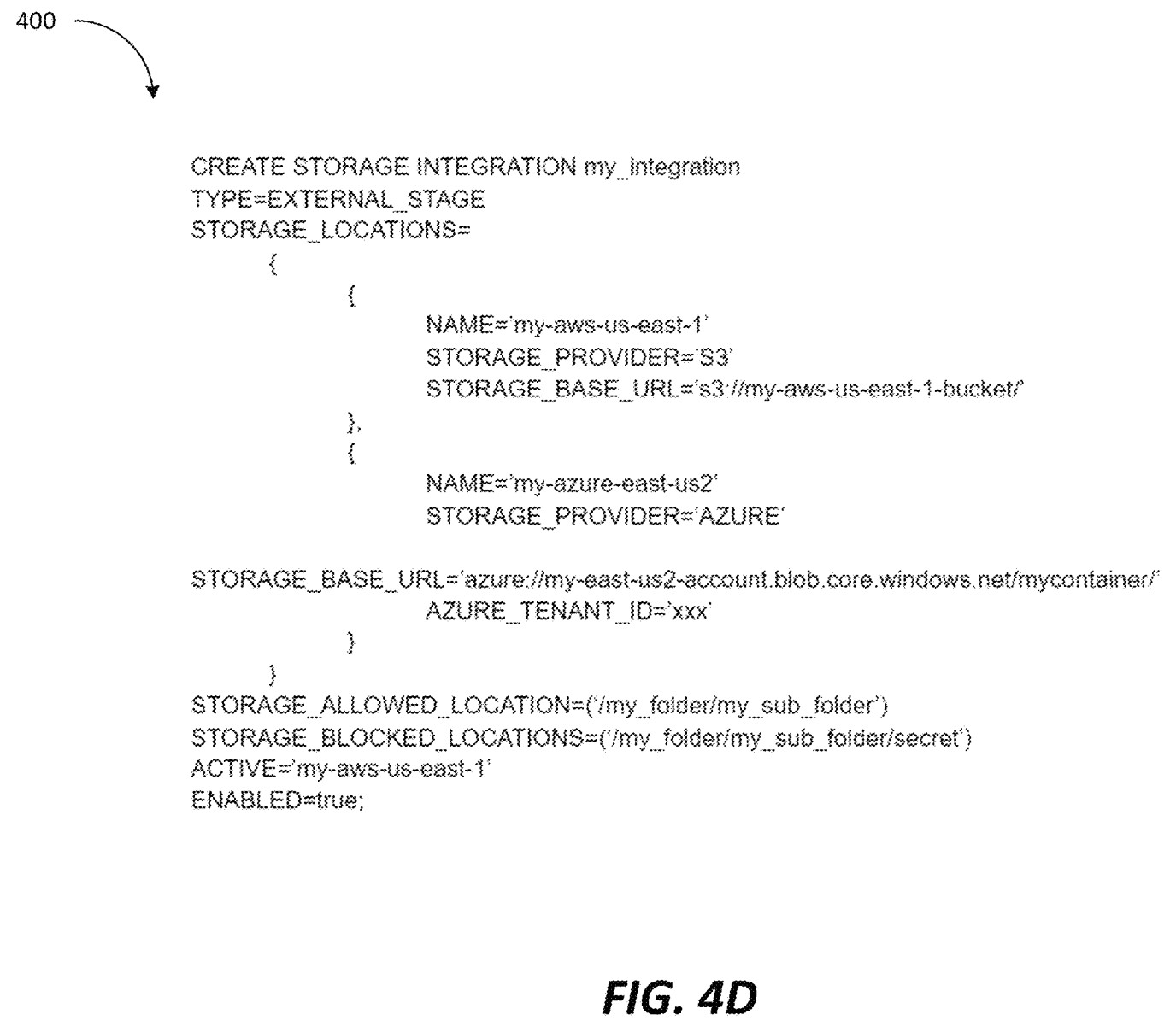

```
CREATE STORAGE INTEGRATION my_integration
TYPE=EXTERNAL_STAGE
STORAGE_LOCATIONS=
    (
        {
            NAME='my-aws-us-east-1'
            STORAGE_PROVIDER='S3'
            STORAGE_BASE_URL='s3://my-aws-us-east-1-bucket/'
        },
        {
            NAME='my-azure-east-us2'
            STORAGE_PROVIDER='AZURE'
            STORAGE_BASE_URL='azure://my-east-us2-account.blob.core.windows.net/mycontainer/'
            AZURE_TENANT_ID=xxx'
        }
    )
STORAGE_ALLOWED_LOCATION=('my_folder/my_sub_folder')
STORAGE_BLOCKED_LOCATIONS=('my_folder/my_sub_folder/secret')
ACTIVE='my-aws-us-east-1'
ENABLED=true;
```

*FIG. 4D*

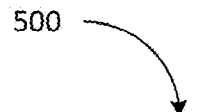

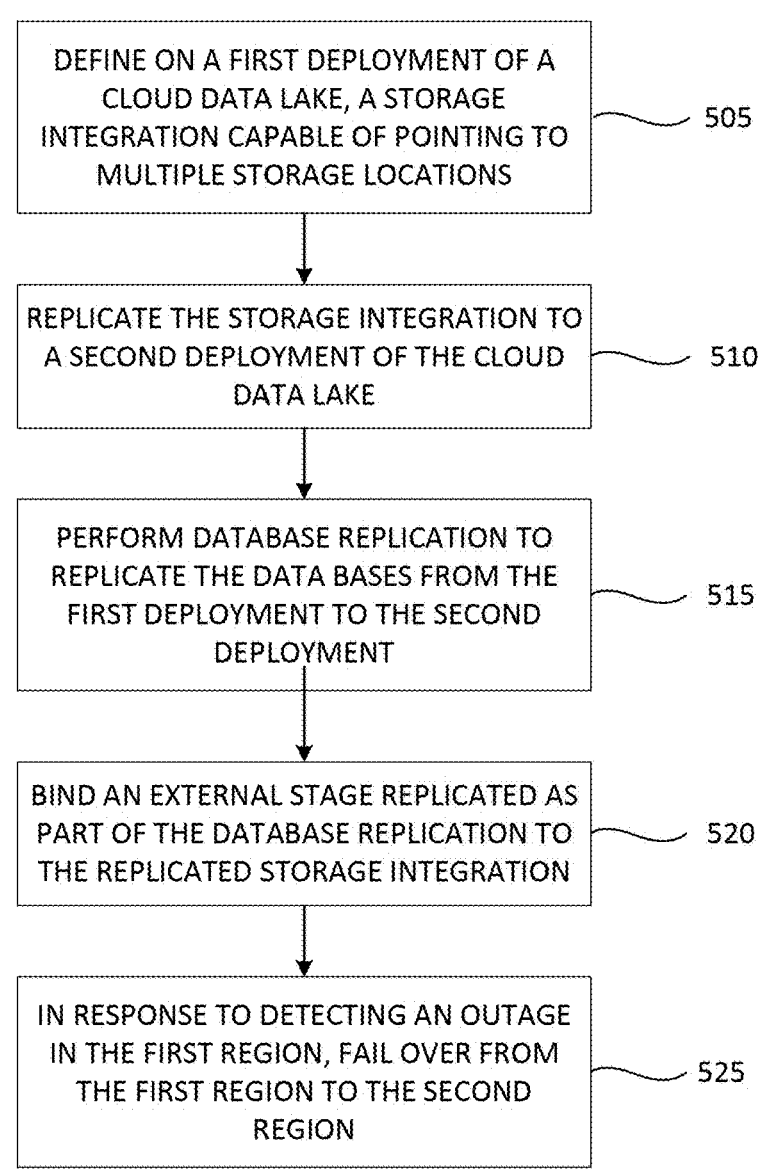

500

DEFINE ON A FIRST DEPLOYMENT OF A CLOUD DATA LAKE, A STORAGE INTEGRATION CAPABLE OF POINTING TO MULTIPLE STORAGE LOCATIONS — 505

REPLICATE THE STORAGE INTEGRATION TO A SECOND DEPLOYMENT OF THE CLOUD DATA LAKE — 510

PERFORM DATABASE REPLICATION TO REPLICATE THE DATA BASES FROM THE FIRST DEPLOYMENT TO THE SECOND DEPLOYMENT — 515

BIND AN EXTERNAL STAGE REPLICATED AS PART OF THE DATABASE REPLICATION TO THE REPLICATED STORAGE INTEGRATION — 520

IN RESPONSE TO DETECTING AN OUTAGE IN THE FIRST REGION, FAIL OVER FROM THE FIRST REGION TO THE SECOND REGION — 525

*FIG. 5*

STAGE REPLICATION IN A CLOUD DATA LAKE

RELATED APPLICATIONS

This application is a continuation of U.S. application Ser. No. 18/119,775 filed Mar. 9, 2023, which is a continuation of U.S. application Ser. No. 17/396,576 (now U.S. Pat. No. 11,620,307) filed Aug. 6, 2021, which claims the benefit of U.S. Provisional Application No. 63/197,951, filed Jun. 7, 2021, the contents of which are hereby incorporated by reference.

TECHNICAL FIELD

The present disclosure relates to cloud data lakes, and particularly to replication of external stages across deployments of a cloud data lake.

BACKGROUND

Databases are widely used for data storage and access in computing applications. Databases may include one or more tables that include or reference data that can be read, modified, or deleted using queries. Databases may be used for storing and/or accessing personal information or other sensitive information. Secure storage and access of database data may be provided by encrypting and/or storing data in an encrypted form to prevent unauthorized access. In some cases, data sharing may be desirable to let other parties perform queries against a set of data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 1 is a block diagram of an example cloud data lake, in accordance with some embodiments of the present disclosure.

FIG. 4A illustrates one example of a modified storage integration, in accordance with some embodiments of the present disclosure.

FIG. 4B is a block diagram of a cloud data lake implemented across multiple deployments, in accordance with some embodiments of the present disclosure.

FIG. 4C illustrates one example of an external stage, in accordance with some embodiments of the present disclosure.

FIG. 4D illustrates one example of a modified storage integration with storage locations defined cross-cloud, in accordance with some embodiments of the present disclosure.

FIG. 5 is a flow diagram of a method of using modified storage integrations to facilitate external stage replication, in accordance with some embodiments of the present disclosure.

DETAILED DESCRIPTION

Figure 2:
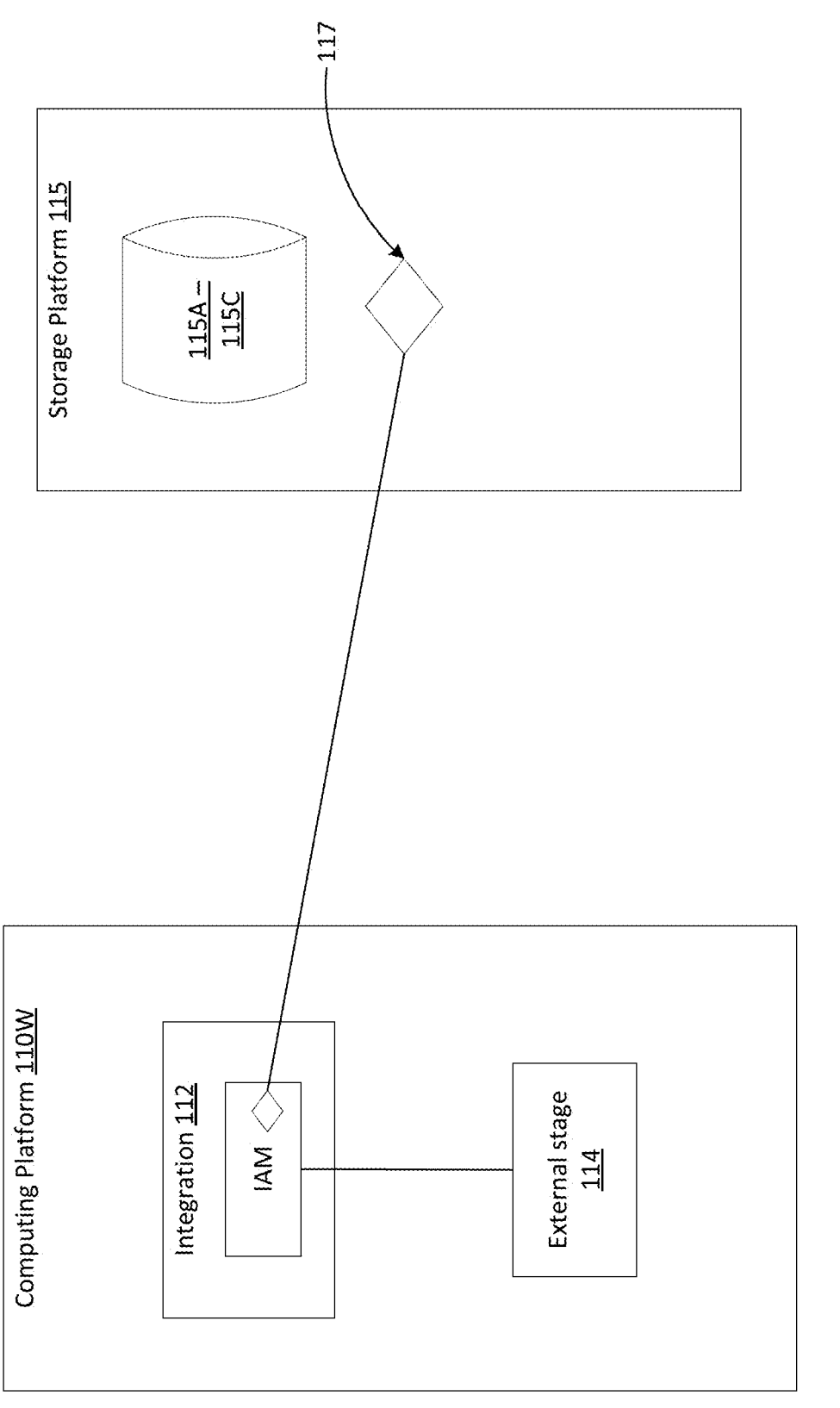
FIG. 2 is a block diagram illustrating external stage and storage integration functionality in a cloud data lake, in accordance with some embodiments of the present disclosure.

A cloud data lake is a cloud-hosted centralized repository that allows an organization to store all of its structured and unstructured data at any scale, typically using an object store such as e.g., Amazon's S3 service or Microsoft's Azure Data Lake Storage (ADLS). A data lake's placement in the cloud means it can be interacted with as needed, whether it's for processing, analytics, or reporting. Cloud data lakes can be used to store an organization's data, including data generated from internal and external actions and interactions. A data lake can include structured data from relational databases (rows and columns), semi-structured data such as comma separated value (CSV) and JSON, unstructured data (documents, etc.), and binary data such as images or video. The primary utility of this shared data storage is in providing a united source for all data in an organization. Each of these data types can then be collectively transformed, analyzed, and more.

A cloud data lake may utilize a data processing platform to provide a data warehouse that can make virtually all of an organization's data available to a near-unlimited number of users and enable efficient data exploration with instant and near-infinite scalability and concurrency. The data processing platform (hereinafter referred to as a computing platform) may use external tables to directly query data from the object store of a data lake without having to move the data. The computing platform may comprise an architecture with extensible data pipelines that can process virtually all of an organization's data and easily load and unload the data to and from the data lake's object store, auto ingest data and enable change data capture (CDC) with continuous data pipelines, and transform data efficiently with ANSI SQL, among other functions.

The computing platform may use external stages to allow customers to load tables from their data lake into the data warehouse and export tables from the data warehouse to object storages within their data lake. A customer may write pipelines to copy data from external stages into the computing platform. A customer may also use external tables to query data directly from external stages without loading them into the computing platform.

Many organizations may wish to replicate their data warehouse cross-region (e.g., to different deployments of the computing platform) for disaster recovery and business continuity, as the data warehouse contains business critical data. In case of an outage at a first deployment of the computing platform, customers do not want to lose the business critical data, and in case of an extended outage, they do not want to lose business continuity of analyzing that data. Although organizations can replicate their data warehouses cross-region, they cannot seamlessly switch their ETL and ingest workloads from one computing platform deployment to another. For example, if customers replicate their data warehouse from region A, to region B, and they fail-over to region B, they cannot seamlessly and automatically continue data loading pipelines that were active in region A on region B or using external tables in region B. In order to do so, customers must manually copy over the relevant external stages to the desired deployment, so that they can continue their pipelines. Manually copying over external stages requires customers to write complex scripts and can be error prone as well.

The systems and methods described herein provide means for replicating external stages between deployments of e.g., a cloud data lake using a modified storage integration. The modified storage integration may be defined with multiple storage locations that it can point to, as well as a designation of an active storage location. The storage integration may also be defined with base file paths for each storage location as well as a relative file path which together may serve to synchronize data loading operations between deployments when e.g., a fail-over occurs from one deployment to another. The storage integration may be replicated from a first deployment to a second deployment, and when database replication occurs, an external stage may be replicated to the second deployment. The replicated external stage may be bound to the replicated storage integration (which may designate the second deployment as active), at which point a fail-over to the second deployment (e.g., due to an outage at the first deployment) may result in a seamless transition of data loading processes to the second deployment.

FIG. 1 is a block diagram of a cloud platform 100 in which the systems and methods described herein may be implemented. The cloud platform 100 may comprise any appropriate cloud data lake (or similar cloud system) such as the Amazon Web Services (AWS) platform, Microsoft's Azure platform, or the Google Cloud platform, for example. The cloud platform 100 may comprise a computing platform 110W and a storage platform 115. The storage platform 115 may facilitate the storing of data on the cloud platform 100 and may comprise an appropriate object storage service such as e.g., the Amazon S3 service to store data and query results on the cloud platform 100. The storage platform 115 may comprise multiple buckets (databases) 115A-115C. In the example of FIG. 1, data on storage platform 115 may be distributed across the buckets 115A-115C. The computing platform 110W may provide databases DB1-W and DB2-W which may represent a data warehouse that provides a single, governed, and immediately queryable source for all of the data on cloud platform 100. The computing platform 110W (via DB1-W and DB2-W) may facilitate data management and access functionality as well as data analysis functions (e.g., SQL queries, analysis) and other computation capabilities (e.g., secure data sharing between users of the cloud platform 100). Cloud platform 100 is shown in FIG. 1 with a single deployment (my-us-west-1), but may have any appropriate number of deployments as discussed in further detail here.

As discussed herein, the computing platform 110W may utilize external stages to allow customers to load tables from and export tables to buckets 115A-115C on storage platform 115. For example, customers may write pipelines to copy data from external stages into the computing platform 110W. Customers may also use external tables to query data directly from external stages without loading them into the computing platform 110W. FIG. 2 illustrates the interaction between the computing platform 110W and the storage platform 115 when an external stage is used to move data between the computing platform 110W and the storage platform 115. The computing platform 110W includes an integration 112 (also referred to as an integration object or a storage integration) which is a named, first-class object that avoids the need for passing explicit cloud provider credentials such as secret keys or access tokens. The integration 112 may store a cloud platform identity and access management (IAM) user ID of the customer and a cloud platform administrator of the customer may grant the IAM user ID permissions in the storage platform 115. An external stage 114 (also referred to as a stage object) references the integration 112 in its definition.

The storage platform 115 generates a proxy entity 117 that has permissions to access the customer's buckets 115A-115C and the integration 112 may leverage the proxy entity 117 to access the buckets 115A-115C. In this way, authentication secrets are never transmitted from the computing platform 110W to the storage platform 115. Instead, credentials for the proxy entity 117 are provided to the storage platform 110's authentication service and exchanged for short-term tokens. Using the short-term token, the external stage 114 can access the proxy entity 117 and read data in the customer's buckets 115A-115C. Thus, the customer can create external stages that point to their buckets without passing explicit credentials to the computing platform 110.

Figure 3:
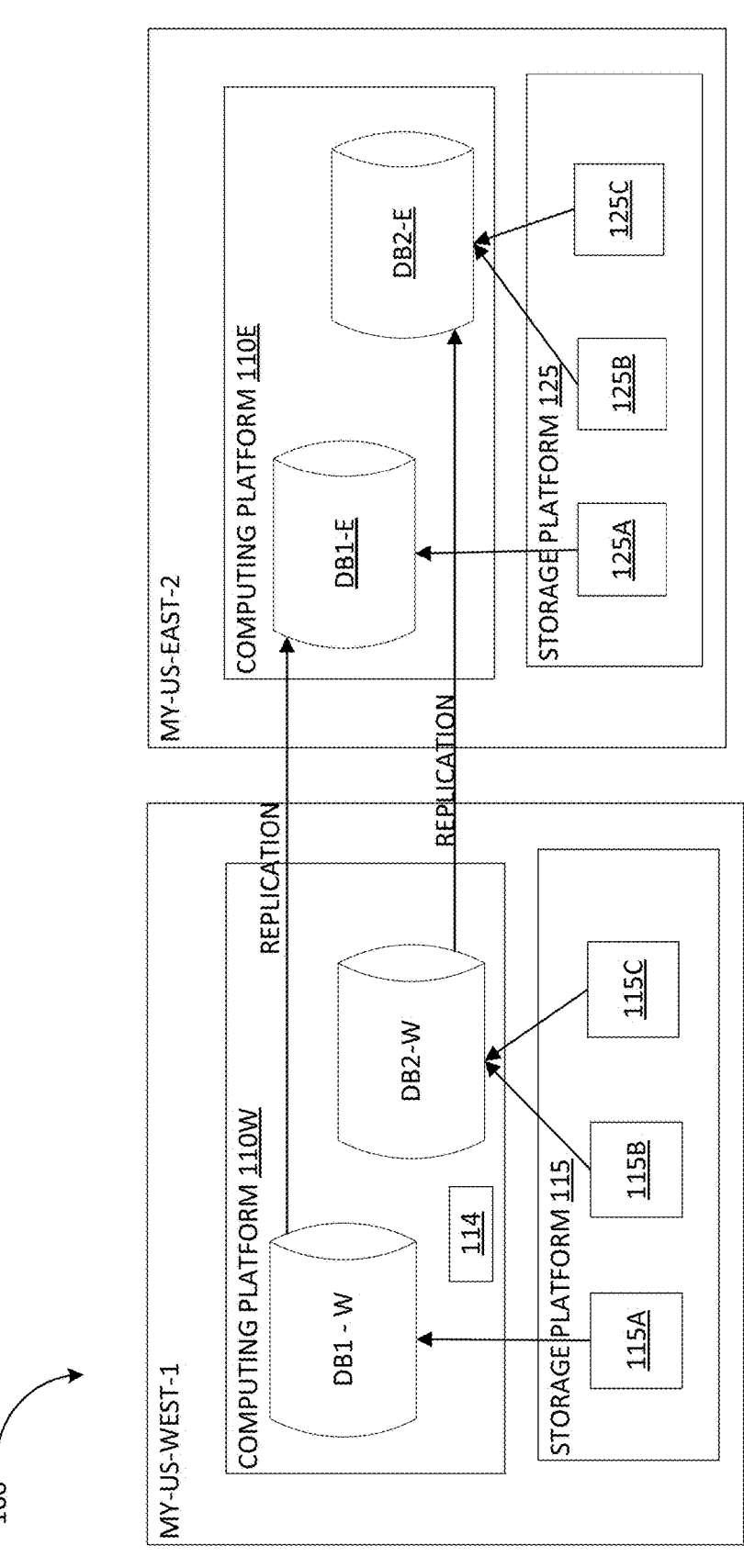
FIG. 3 is a block diagram of a cloud data lake implemented across multiple deployments, in accordance with some embodiments of the present disclosure.

FIG. 3 illustrates the cloud platform 100 with an additional deployment (my-us-east-2) where another account for the computing platform 110 (computing platform 110E) may be located. As described above, the customer (via the client application) may upload raw data to storage platform 115, and may use external stages of the computing platform 110W to ingest data from the storage platform 115 to DB1-W and DB2-W (the data warehouse) for analysis and other similar purposes. The customer may want to replicate DB1-W and DB2-W cross-region for disaster recovery and business continuity. However, if the customer attempts to replicate the external stage 114 from the computing platform 110W to computing platform 110E, both the external stage 114 and the replicated external stage will point to different storage locations. More specifically, the external stage 114 will point to a storage location on my-us-west-1, while the replicated external stage on computing platform 110E will point to a storage location on my-us-east-2. In addition, the credentials for each of these storage locations will also be different.

Embodiments of the present disclosure provide a modified storage integration that can point to multiple locations and thereby facilitate replication of external stages across deployments. Although the techniques described herein are described with respect to replication of external stages, this is by example only and the techniques described herein can be applied in a variety of contexts such as enabling failover, providing for production/non-production/test location control, and enabling an administrator to dynamically change what storage is being used. FIG. 4A is a diagram illustrating an example of a modified storage integration 400 in accordance with some embodiments of the present disclosure. The storage integration 400 may include a "STORAGE LOCATIONS" parameter where multiple storage locations can be defined by a customer. As shown in FIG. 4A, storage integration 400 has been defined with 2 different storage locations ("my-us-east-1" and "my-us-west-2"), although any appropriate number of storage locations may be defined. FIG. 4A also shows how the storage integration 400 includes an "ACTIVE" parameter where an active storage location (the storage location the storage integration 400 is currently pointing to) may be defined. The active storage location may be the storage location where a data loading operation is currently in progress. As shown in FIG. 4A, storage integration 400 has been defined with "my-us-east-1" as the active storage location. Although illustrated in FIG. 4A with both storage locations implemented on the same cloud, this is not a limitation and the defined storage locations can be cross-cloud (e.g., one storage location may be an AWS deployment while another may be an Azure deployment as shown in FIG. 4D) as well as cross-deployment. The storage integration 400 may also be defined with encryption options for each defined storage location as shown in the "ENCRYPTION" field of the storage integration 400.

Referring also to FIG. 4B, when an external stage 402 is bound to the storage integration 400, the external stage 402 will point to the base URL that the active storage location points to (in the example of FIG. 4A, s3://my_bucket_us_east-1/). The external stage 402 may refer to storage integration 400 using integration-relative paths as shown in FIG. 4C, illustrating the external stage 402. The customer may then replicate the storage integration 400 to my-us-west-2 (resulting in the replicated storage integration 401). Upon replication, storage integration 401 will still have "my-us-east-1" as the default active storage location, however the customer may set the active storage location for storage integration 401 to either my-us-west-2 or my-us-east-1. As can be seen in FIG. 4A, each defined storage location also includes respective security credentials for that storage location (STORAGE_AWS_ROLE_ARN='role-arn-us-west'). Although described and illustrated with respect to storage integrations supported by AWS, storage integrations based on any appropriate platform may be utilized.

At this point, the customer may initiate database replication and create secondary databases (DB1-W and DB2-W) on my-us-west-2. When DB1-W and DB2-W are replicated and refreshed, the external stage 402 is replicated to my-us-west-2 (resulting in external stage 403). The external stage 403 will bind to the integration 401 and will point to the base URL that integration 401 points to (e.g., "s3://my_bucket_us_east-1/" if the active storage location specified in integration 401 is my-us-east-1). At this point, in the event of an outage at my-us-east-1, the customer can seamlessly fail-over to my-us-west-2 and automatically continue a data loading process from my-us-east-1 as discussed below.

The storage integration 400 may also store base URLs for synchronizing a data upload process that is in progress on my-us-east-1 (e.g., from storage platform 125 to computing platform 110E) to my-us-west-2 in the event of a fail over. Stated differently, when a fail over to my-us-west-2 occurs, the customer may want to seamlessly continue a data loading process that was in progress on my-us-east-1 by having the corresponding files ready on my-us-west-2 upon load up, but also may wish to ensure that the same file is not being duplicated twice into the computing platform 110. The storage integration 400 may address this by providing a "STORAGE_BASE_URL" parameter that indicates a base URL (base file path) for each of the relative storage locations ("s3://my_bucket_us_east-1/" and "s3://my_bucket_us_west-2/" as shown in FIG. 4A). The "STORAGE_ALLOWED_LOCATIONS" parameter of the storage integration 400 may provide a relative URL (relative file path) ('my_folder/my_sub_folder') for identifying particular files. Thus, although the base URL for each storage location is different, the relative URLs of the files after the base URL are the same. For example, on us_east-1, a first file (file 1) can be located at "my_bucket_us_east-1/my_folder/my_sub_folder/file 1" while on us_west-2 the file 1 can be located at "my_bucket_us_west-2/my_folder/my_sub_folder/file 1."

The computing platform 110 may store the base URL (as a new field), and the relative URL (as the current file path) field in load history. If there is no integration, then the base URL will be null/empty, and the absolute path of the file will be stored in the file path field. When checking to see if a file has been loaded already, the computing platform 110 may first split up the file path of the file into an integration (if any), and an integration-relative file-path. If an entry in load history where the relative-path in the load history entry matches the relative path of the candidate file is found, and the base path in the load history entry matches any of the base locations of the integration, then the file may be determined to have already been loaded. The key aspect here is establishing an equivalence class of base-prefixes (integrations) such that we can compare two files whose absolute paths do not match, but which can nevertheless be considered equivalent. In this way, when my-us-east-1 goes down, the customer only needs to fail over to my-us-west-2 and they can continue loading data at the point they were at when my-us-east-1 went down.

Since the storage base URL is moved to the storage integration 400, the relative URL for the external stage will reside with the stage object as illustrated in FIG. 4C. As can be seen, the stage object uses the relative URL, and does not use any absolute URLs. Thus, the stage object 430 could be pointing to any storage location defined in the storage integration 400 (and whichever storage location is active). The stage object 430 does not contain any region specific information.

It should be noted that the embodiments of the present disclosure may be applied to storage managed by the customer as well as storage managed by the computing platform. For example, although discussed with respect to external stages, embodiments of the present disclosure may be used to replicate other states such as table stages, user stages, and internal stages. However, when replicating these other types of stages, associated storage integrations do not include designations for active storage locations or definitions for multiple locations. This is because each of these other types of stages are managed by a computing platform, and not the customer. In addition, table stages come for free with every internal table and once a table is replicated from primary deployment to secondary deployment, the table stage is also automatically replicated. In a similar manner, both an internal stage and a user stage can be replicated to multiple deployments, at which point the files contained within the stage are copied to the new deployments.

FIG. 5 is a flow diagram of a method 500 for using modified storage integrations to facilitate storage integration replication, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by computing platform 110 (illustrated in FIG. 4B).

At block 505, the computing platform 110 may define on a first deployment of a cloud data lake, a storage integration capable of pointing to multiple storage locations. At block 510, the computing platform 110 may replicate the storage integration to a second deployment of the cloud data lake. At block 515, the computing platform 110 may perform database replication to replicate the data bases from the first deployment to the second deployment. At block 520, an external stage replicated as part of the database replication may bind to the replicated storage integration. At block 525, in response to detecting an outage in the first region, a customer may fail over from the first region to the second region, where the replicated external stage may seamlessly continue a data loading process of the first deployment.

Figure 6:
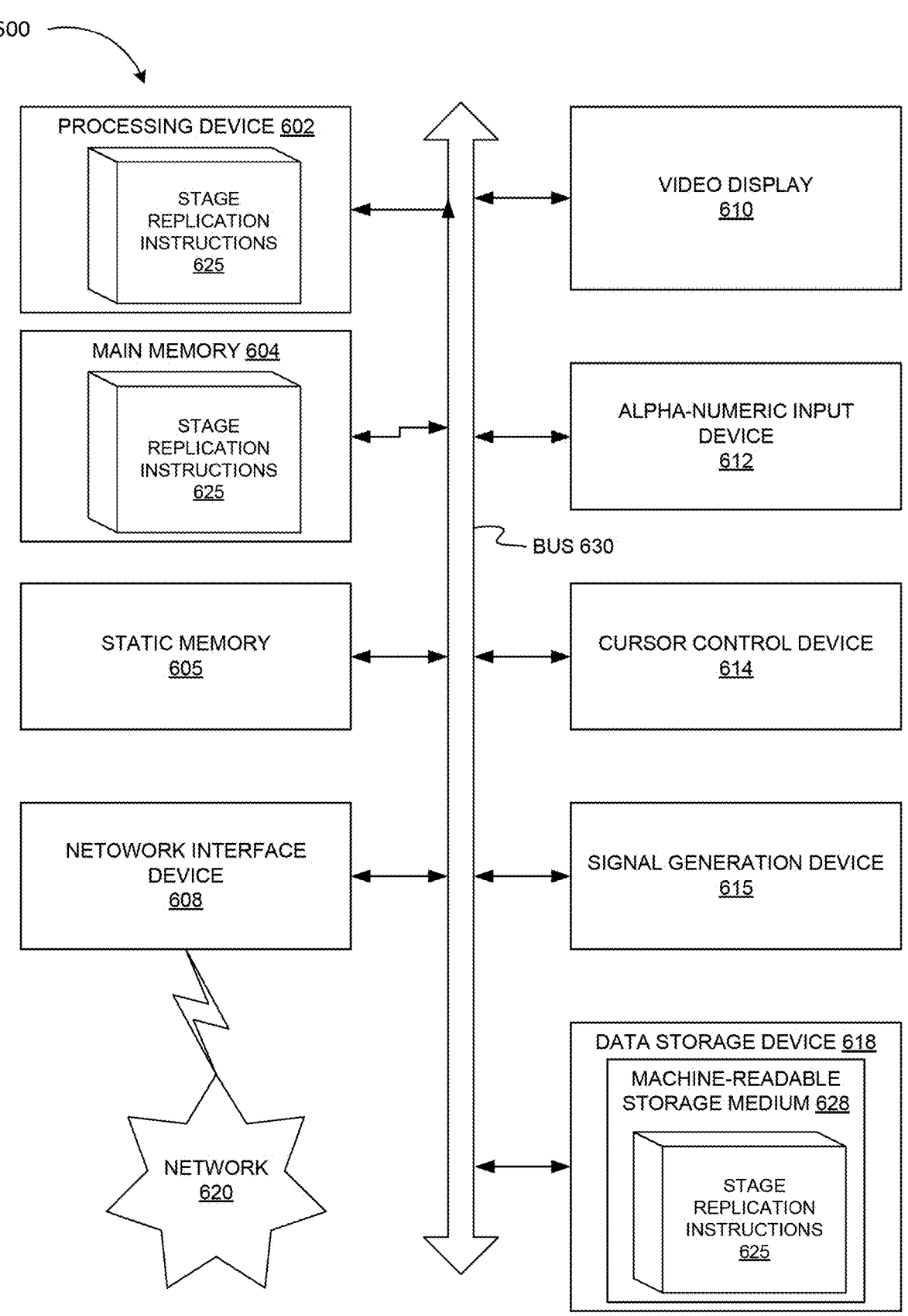
FIG. 6 is a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for replicating a share object to a remote deployment.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server.

The exemplary computer system 600 includes a processing device 602, a main memory 604 (e.g., read-only memory (ROM), flash memory, dynamic random access memory (DRAM), a static memory 605 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computer system 600 may further include a network interface device 608 which may communicate with a network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 615 (e.g., a speaker). In one embodiment, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute stage replication instructions 625, for performing the operations and steps discussed herein.

The data storage device 618 may include a machine-readable storage medium 628, on which is stored one or more sets of stage replication instructions 625 (e.g., software) embodying any one or more of the methodologies of functions described herein. The stage replication instructions 625 may also reside, completely or at least partially, within the main memory 604 or within the processing device 602 during execution thereof by the computer system 600; the main memory 604 and the processing device 602 also constituting machine-readable storage media. The stage replication instructions 625 may further be transmitted or received over a network 620 via the network interface device 608.

The machine-readable storage medium 628 may also be used to store instructions to perform a method for determining functions to compile, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "routing," "granting," "determining," "publishing," "providing," "designating," "encoding," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned (including via virtualization) and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud). The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    defining, by a processing device, a storage integration with a set of storage locations, wherein the storage integration comprises a base URL for each of the set of storage locations and wherein each storage location identifies a remote deployment where a cloud platform is hosted;

creating a replicated external stage object on a second storage location based on an external stage object from a first storage location bound to the storage integration; and transitioning a data loading operation from the first storage location to the second storage location via the replicated external stage object based on a detected outage or interruption of the data loading operation at the first storage location, wherein the storage integration further comprises a relative URL for each of a set of files that is part of the data loading operation so as to synchronize the data loading operation across the first storage location and the second storage location.

2. The method of claim 1, wherein synchronization of the data loading operation comprising:

determining, for each candidate file of the set of files that is part of the data loading operation, whether a candidate file has been loaded based at least on a file path of the candidate file split into a first base URL and a first relative URL, a comparison of the first base URL and the first relative URL to entries in a load history, and a determination that the first relative URL of the candidate file matches an entry in the load history, and the first base URL of the entry matches any of storage locations in the set of storage locations of the storage integration.

3. The method of claim 2, further comprising:

loading candidate files that have not already been loaded into the second storage location.

4. The method of claim 1, further comprising:

replicating the storage integration to the second storage location to generate a replicated storage integration.

5. The method of claim 4, wherein the storage integration and the replicated storage integration each designate the first storage location as an active storage location that corresponds to a storage location where the data loading operation is currently in progress.

6. The method of claim 1, wherein the storage integration further comprises respective security credentials for each of the set of storage locations.

7. The method of claim 1, wherein the first storage location and the second storage location each correspond to a deployment of a data lake.

8. The method of claim 1, wherein the data loading operation is continued at the second storage location as part of a failover from the first storage location to the second storage location.

9. A system, comprising:

a memory; and a processing device; instructions stored in the memory, the instructions executed by the processing device to:

define a storage integration with a set of storage locations, wherein the storage integration comprises a base URL for each of the set of storage locations and wherein each storage location identifies a remote deployment where a cloud platform is hosted;

create a replicated external stage object on a second storage location based on an external stage object from a first storage location bound to the storage integration; and transition a data loading operation from the first storage location to the second storage location via the replicated external stage object based on a detected outage or interruption of the data loading operation at the first storage location, wherein the storage integration further comprises a relative URL for each of a set of files that is part of the data loading operation so as to synchronize the data loading operation across the first storage location and the second storage location.

10. The system of claim 9, wherein to synchronize the data loading operation, the processing device is to:

determine, for each candidate file of the set of files that is part of the data loading operation, whether a candidate file has been loaded based at least on a file path of the candidate file split into a first base URL and a first relative URL, a comparison of the first base URL and the first relative URL to entries in a load history, and a determination that the first relative URL of the candidate file matches an entry in the load history, and the first base URL of the entry matches any of storage locations in the set of storage locations of the storage integration.

11. The system of claim 10, wherein the processing device is further to:

load candidate files that have not already been loaded into the second storage location.

12. The system of claim 9, wherein the processing device is further to:

replicate the storage integration to the second storage location to generate a replicated storage integration.

13. The system of claim 12, wherein the storage integration and the replicated storage integration each designate the first storage location as an active storage location that corresponds to a storage location where the data loading operation is currently in progress.

14. The system of claim 9, wherein the storage integration further comprises respective security credentials for each of the set of storage locations.

15. The system of claim 9, wherein the first storage location and the second storage location each correspond to a deployment of a data lake.

16. The system of claim 9, wherein the data loading operation is continued at the second storage location as part of a failover from the first storage location to the second storage location.

17. A non-transitory computer-readable medium having instructions stored thereon which, when executed by a processing device, cause the processing device to:

define, by the processing device, a storage integration with a set of storage locations, wherein the storage integration comprises a base URL for each of the set of storage locations and wherein each storage location identifies a remote deployment where a cloud platform is hosted;

create a replicated external stage object on a second storage location based on an external stage object from a first storage location bound to the storage integration; and transition a data loading operation from the first storage location to the second storage location via the replicated external stage object based on a detected outage or interruption of the data loading operation at the first storage location, wherein the storage integration further comprises a relative URL for each of a set of files that is part of the data loading operation so as to synchronize the data loading operation across the first storage location and the second storage location.

18. The non-transitory computer-readable medium of claim 17, wherein to synchronize the data loading operation, the instructions, when executed by the processing device, cause the processing device to:

determine, for each candidate file of the set of files that is part of the data loading operation, whether a candidate file has been loaded based at least on a file path of the candidate file split into a first base URL and a first relative URL, a comparison of the first base URL and the first relative URL to entries in a load history, and a determination that the first relative URL of the candidate file matches an entry in the load history, and the first base URL of the entry matches any of storage locations in the set of storage locations of the storage integration.

19. The non-transitory computer-readable medium of claim 18, wherein the instructions, when executed by the processing device, further cause the processing device to:

load candidate files that have not already been loaded into the second storage location.

20. The non-transitory computer-readable medium of claim 17, wherein the instructions, when executed by the processing device, further cause the processing device to:

replicate the storage integration to the second storage location to generate a replicated storage integration.

* * * * *